UNITED STATES PATENT OFFICE.

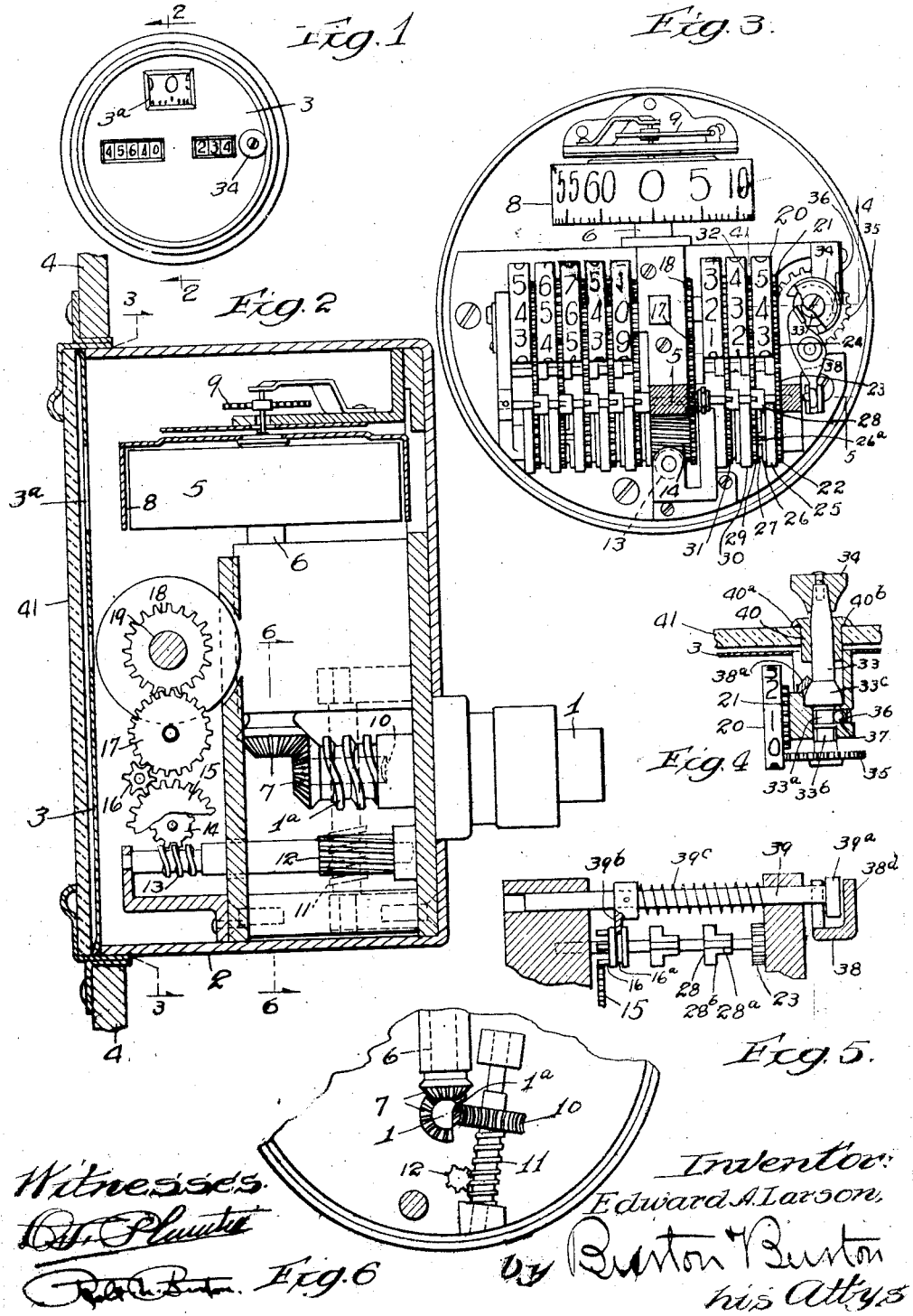

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

ROTATION-METER.

1,214,690.  Specification of Letters Patent.  Patented Feb. 6, 1917.

Application filed March 25, 1915. Serial No. 16,

*To all whom it may concern:*

Be it known that I, EDWARD A. LARSON, a citizen of the United States, residing at Chicago, in the county of Cook and State of Illinois, have invented new and useful Improvements in Rotation-Meters, of which the following is a specification, reference being had to the accompanying drawings, forming a part thereof.

This invention relates to a rotation meter especially designed to serve as a speedometer and odometer for use on motor vehicles.

It consists of the specific features and arrangement of the parts described and shown in the drawings as indicated by the claim.

In the drawings:—Figure 1 is a face elevation of an instrument embodying this invention. Fig. 2 is a vertical section on a larger scale taken as indicated at line 2—2 on Fig. 1. Fig. 3 is a front elevation of the interior mechanism, being taken as a section at line 3—3 on Fig. 2. Fig. 4 is a detail section taken as indicated at line 4—4 on Fig. 3. Fig. 5 is a detail section taken as indicated at line 5—5 on Fig. 3. Fig. 6 is a detail view taken as a section at line 6—6 on Fig. 2.

The instrument shown in the drawings presents the usual combination of a speedometer for indicating the speed of travel, and an odometer for indicating the distance of travel of the vehicle on which it is mounted, both mechanisms being connected for actuation by a single drive shaft, 1, ordinarily arranged to be driven from one of the road wheels or other rotating parts by connections not shown. Such vehicles are generally provided with a dashboard or instrument board which is substantially vertical or slightly inclined to the vertical, and the speedometer is preferably mounted in the dashboard with its casing, 2, sunk in a properly fitted aperture therein, bringing its face or dial, 3, substantially flush with the board, or at least in a plane parallel thereto. Fig. 2 shows a portion of the instrument board at 4, thus illustrating this arrangement. The board, 4, usually forms the back wall of the hood or bonnet covering the vehicle motor, and is therefore located at some distance rearward of the forward road wheels, from one of which the speedometer is ordinarily driven through suitable gears and a flexible shaft coupled with the drive shaft, 1. Thus by arranging the instrument with its drive shaft, 1, extending from the back of the casing, 2, substantially at right angles to the plane of the dial, 3, the flexible shaft, not shown, which extends to the forward road wheel, may pass down through and out at the bottom of the motor hood almost in a direct line, or at least with the minimum of bending.

The speedometer illustrated comprises the usual circular magnet, 5, whose shaft, 6, is connected with the drive shaft, 1, through bevel gears, 7, and whose speed of rotation is indicated by the position of the cup-shaped drag disk, 8, provided with the usual biasing spring, 9, and carrying the dial numerals in a position to appear at the window, 5ª, of the dial, 3.

The odometer train operates upon the familiar Geneva stop principle. The worm, 1ª, on the drive shaft, 1, meshes with a worm wheel, 10, rigid with a second worm, 11, meshing with a second worm wheel or gear, 12, and the shaft of the gear, 12, is provided with a third worm, 13, which meshes with a gear, 14, thus giving the desired reduction of speed between the drive shaft, 1, and the odometer train. The gear, 14, carries a larger gear, 15, which connects through idlers, 16 and 17, with a gear, 18, fast on the hub, 19, of the first numeral-bearing wheel, 20. A gear, 21, on said numeral-bearing wheel is connected to a gear, 22, through idler gears, 23 and 24, similar to and co-axial with the idlers, 16 and 17, respectively; rigid with the gear, 22, and separated from it by the spacing disk, 25, is a disk, 26, having a single notch, 26ª, and rigid with this disk is a mutilated gear, 27, having only two teeth positioned to mesh with the longer teeth, 28ª, of the idler, 28. The shorter teeth, 28ᵇ, alternate with the longer teeth, 28ª, and both series of teeth mesh with the gear 29 which is loose on the shaft of the gear, 22, but rigid with the next spacing disk, 30.

Each revolution of the gear, 22, corresponds to one revolution of the dial wheel, 20, and during each such revolution the notch, 26ª, and the two teeth of the gear, 27, meshing with one of the longer teeth, 28ª, of the idler, 28, rotate said idler by a distance of two teeth, and such rotation is communicated through the idler to the gear, 29, advancing said gear by a distance of two teeth, which is preferably for this purpose equivalent to one-tenth of a revolution. The gear, 29, and its spacer, 30, are provided with a notched disk and a mutilated gear of two teeth similar to the elements, 26 and 27, so that for each revolution of the gear, 29, there is produced one-tenth of a rotation of the next succeeding gear, 31, and so on throughout the entire odometer train. As illustrated, the odometer train consists of two series of dial wheels and their corresponding gears, the gears, 22, 29 and 31, relating to the trip odometer, which may be reset independently of the other train shown located at the other side of the actuating gear, 14.

In previous constructions the gear, 14, has been connected rigidly with the spacing disk, 25, or its gear, 22, and the spacing disk, 25, as well as the other spacing disk similar to it, have constituted the numeral bearing dial wheels; but with this arrangement the width of the dial wheels has been so limited on account of the space necessarily occupied by the other elements of the train, that is, the disk, 26, the mutilated gear, 27, and the gear, 29, that the numerals imprinted thereon were not large enough to be easily readable and were spaced apart from each other by an undesirable amount. For this reason it has been deemed preferable to place the numerals upon separate wheels, like the wheel, 20, which could be of about the full width of the combined gear, 27, the disk, 26, and spacing disk, 25. Each of the numeral-bearing wheels is then fitted with a rigid gear like gear, 21, and operatively connected through idler gears such as 23 and 24, with the corresponding gear like 22, of the train already described. Thus the necessary space between consecutive numeral-bearing wheels is only sufficient to admit a comparatively thin idler gear, such as that shown at 32, and the area available for the numerals is considerably increased. As shown, the numeral-bearing wheels are also larger in diameter than the spacing disks like 25, so that the numerals may be proportionately enlarged in circumferential direction as well as in the direction of the axis.

The trip odometer is of course intended to be reset to zero or to any other desired reading without changing the reading of the total register. This is accomplished by means of the shaft, 33, carrying the knurled wheel, 34, at its outer end, and a gear, 35, at its inner end, which will mesh with the gear, 21, on the first dial wheel, 20, when the shaft is pulled out in the direction of its axis a short distance from the normal position with respect to the dial, 3. A spring catch composed of a flat spring, 36, bearing upon a ball, 37, which is designed to engage either the groove, $33^a$, or the groove, $33^b$, in the shaft, 33, serves to definitely position the gear, 35, in or out of engagement with the gear, 21. As the shaft, 33, is pulled out to effect engagement of the gears, 35 and 21, its conical cam surface, $33^c$, operates against the end, $38^a$, of the shifter lever, 38, to draw the idler gear, 16, out of mesh with the gears, 15 and 17, thus disconnecting the trip odometer from the actuating gear, 14, and from the total odometer train, so as to permit the free rotation of the trip dial wheels to any desired position. As indicated in Fig. 5, the end, $38^d$, of the lever, 38, is clamped to engage the head, $39^a$, of the shifter rod, 39, which carries a finger, $39^b$, extending into a groove, $16^a$, in the hub of the gear, 16, for shifting the latter in an obvious manner. The shaft, 33, is preferably arranged to project directly out from the dial plate, 3, thus keeping it within the circular outline of the instrument casing, 2, and simplifying the mounting of the instrument in the instrument board, 4. A bushing, 40, serves as a bearing for the shaft, 33, and is formed with a flange, $40^a$, slightly grooved or undercut at $40^b$, to receive cement for securing it to the surface of the glass, 41, covering the dial plate, 3.

I claim:

A meter comprising a casing; a dial covering the front of the casing; a glass on one side of the dial, and indicator mechanisms, all of which are on the other side of the dial; operating mechanisms for the indicator mechanism, a re-setting key which passes through the dial and the glass, and which is normally disconnected from the indicator mechanism but which is longitudinally movable for connection therewith, and means for disconnecting the indicator mechanism from the operating mechanisms when the key is longitudinally moved.

In testimony whereof, I have hereunto set my hand at Chicago, Illinois, this 22nd day of March, 1915.

EDWARD A. LARSON.

Witnesses:
 ROBT. N. BURTON,
 EDNA M. MACINTOSH.